(12) United States Patent
Brink et al.

(10) Patent No.: US 7,447,965 B2
(45) Date of Patent: Nov. 4, 2008

(54) OFFSET TEST PATTERN APPARATUS AND METHOD

(75) Inventors: Robert D. Brink, Coopersburg, PA (US); James Walter Hofmann, Jr., Lansdale, PA (US); Max J. Olsen, Mertztown, PA (US); Gary E. Schiessler, Allentown, PA (US); Lane A. Smith, Easton, PA (US)

(73) Assignee: Agere Systems Inc., Allentown, PA (US)

( * ) Notice: Subject to any disclaimer, the term of this patent is extended or adjusted under 35 U.S.C. 154(b) by 197 days.

(21) Appl. No.: 11/121,164

(22) Filed: May 3, 2005

(65) Prior Publication Data

US 2006/0253757 A1  Nov. 9, 2006

(51) Int. Cl.
  *G01R 31/28* (2006.01)
  *G06F 11/00* (2006.01)
(52) U.S. Cl. ....................................................... 714/738
(58) Field of Classification Search .......... 714/100–824
  See application file for complete search history.

(56) References Cited

U.S. PATENT DOCUMENTS

| | | | | |
|---|---|---|---|---|
| 5,003,308 | A * | 3/1991 | Furniss et al. ................... | 341/1 |
| 5,163,057 | A | 11/1992 | Grupp ........................ | 371/47.1 |
| 5,282,211 | A * | 1/1994 | Manlick et al. ............. | 714/707 |
| 5,392,314 | A | 2/1995 | Wolf ........................... | 375/10 |
| 5,592,674 | A * | 1/1997 | Gluska et al. ............... | 710/269 |
| 5,726,991 | A | 3/1998 | Chen et al. | |
| 5,991,344 | A * | 11/1999 | Fujii et al. ................... | 375/344 |
| 6,032,282 | A * | 2/2000 | Masuda et al. .............. | 714/744 |
| 6,041,429 | A * | 3/2000 | Koenemann ................ | 714/738 |
| 6,041,492 | A * | 3/2000 | Hishikawa ................... | 29/714 |
| 6,201,829 | B1 | 3/2001 | Schneider | |
| 6,363,060 | B1 * | 3/2002 | Sarkar ........................ | 370/342 |
| 6,373,861 | B1 * | 4/2002 | Lee ............................. | 370/503 |
| 6,498,929 | B1 * | 12/2002 | Tsurumi et al. ............. | 455/296 |
| 6,553,529 | B1 * | 4/2003 | Reichert ..................... | 714/738 |

(Continued)

FOREIGN PATENT DOCUMENTS

WO  WO 2005/015248  2/2005

OTHER PUBLICATIONS

Brink et al., "Exploitive Test Pattern Apparatus and Method," U.S. Appl. No. 11/121,152 (May 3, 2005).

(Continued)

*Primary Examiner*—Jacques Louis-Jacques
*Assistant Examiner*—Guerrier Merant
(74) *Attorney, Agent, or Firm*—Ryan, Mason & Lewis, LLP

(57) ABSTRACT

Communications equipment can be tested using a test pattern encapsulated within a frame, and offsetting the test pattern in each successive frame. In equipment having a number of data latches receiving serial input, the introduction of the offset allows each latch, over time, to be exposed to the same pattern as the other latches. That is, the latches "see" different portions of the pattern at a given time, but over time, each can be exposed to the full pattern. Otherwise, each latch would "see" its own static pattern, different from the other latches, but the same over time with respect to itself. The offset can enhance diagnostic capabilities of the test pattern.

9 Claims, 5 Drawing Sheets

U.S. PATENT DOCUMENTS

| | | | |
|---|---|---|---|
| 6,684,350 B1 | 1/2004 | Theodoras, II et al. | 714/712 |
| 6,834,367 B2 | 12/2004 | Bonneau et al. | |
| 6,865,660 B2 * | 3/2005 | Duncan | 711/217 |
| 6,977,960 B2 | 12/2005 | Takinosawa | |
| 7,042,842 B2 * | 5/2006 | Paul et al. | 370/229 |
| 7,062,696 B2 * | 6/2006 | Barry et al. | 714/738 |
| 7,093,172 B2 | 8/2006 | Fan et al. | |
| 7,111,208 B2 | 9/2006 | Hoang et al. | |
| 2004/0003331 A1 * | 1/2004 | Salmon et al. | 714/738 |
| 2004/0015761 A1 * | 1/2004 | Klotz et al. | 714/738 |
| 2004/0052521 A1 | 3/2004 | Halgren et al. | |
| 2004/0177301 A1 * | 9/2004 | Tarango et al. | 714/738 |
| 2005/0076280 A1 | 4/2005 | Martinez | |
| 2005/0086563 A1 | 4/2005 | Carballo | |
| 2005/0166110 A1 * | 7/2005 | Swanson et al. | 714/728 |
| 2005/0238127 A1 * | 10/2005 | Naffziger et al. | 375/364 |
| 2005/0249001 A1 * | 11/2005 | Tanaka et al. | 365/201 |
| 2005/0270870 A1 * | 12/2005 | Shin et al. | 365/202 |
| 2006/0010358 A1 * | 1/2006 | Miller | 714/700 |
| 2006/0010360 A1 * | 1/2006 | Kojima | 714/738 |
| 2006/0156134 A1 * | 7/2006 | Mukherjee et al. | 714/733 |
| 2006/0203725 A1 * | 9/2006 | Paul et al. | 370/229 |
| 2006/0248424 A1 * | 11/2006 | Colunga et al. | 714/738 |

OTHER PUBLICATIONS

"Annex A Test Bit Sequence," Methodology for Jitter and Signal Quality Specification-MJSQ Technical Report REV 10.0, pp. 117-132 (Mar. 10, 2003).

"IA Title: Common Electrical I/O (CEI)—Electrical and Jitter Interoperability Agreements for 6G+ bps and 11G+ bps I/O," Implementation Agreement OIF-CEI-01.0, Optical Internetworking Forum—Clause 0: Document Structure and Contents, pp. 33-86 (Dec. 13, 2004).

"Series O: Specifications of Measuring Equipment; Equipment for the Measurement of Digital and Analogue/Digital Parameters; General Requirements for Instrumentation for Performance Measurements on Digital Transmission Equipment," ITU-T 0.150, all pages (May 1996).

"Series O: Specifications of Measuring Equipment; Equipment for the Measurement of Digital and Analogue/Digital Parameters; General Requirements for Instrumentation for Performance Measurements on Digital Transmission Equipment; Corrigendum 1," ITU-T 0.150 Corrigendum 1, all pages, (May 2002).

"Fibre Channel; Framing and Signaling (FC-FS) REV 1.80," INCITS Working Draft Proposed American National Standard for Information Technology, pp. 1-79, 574-595 (Mar. 26, 2003).

"Serial ATA: High Speed Serialized AT Attachment," Serial ATA Workshop, Rev. 1.0a, pp. 128-133 (Jan. 7, 2003).

* cited by examiner

OFFSET TEST PATTERN APPARATUS AND METHOD

FIELD OF THE INVENTION

The present invention relates generally to communications equipment, and more particularly relates to an apparatus and method for generating an offset test pattern for testing such equipment.

BACKGROUND OF THE INVENTION

Communications equipment must typically be tested in order to verify proper performance. Such testing can include, for example, development testing, wherein proper functioning of a prototype of a candidate design is verified; acceptance testing, where it is confirmed that an individual component or piece of equipment functions according to specifications; or ongoing field tests, where correct functioning of equipment in the field is monitored. Such testing may be performed, for example, by external test equipment or by built-in self-test (BIST) capability.

One manner of testing communications equipment is to subject the equipment to test patterns that simulate the type of data that the equipment will be handling in use. For example, Fibre Channel Framing and Signaling draft standard FC-FS Rev. 1.80 is a proposed American National Standard for Information Technology. A Fibre Channel jitter tolerance pattern formed by framing an 8b10b encoded random jitter test pattern into a standard frame can be employed with respect to applications of the aforementioned standard. Some types of communications equipment, for example, serializer/deserializers, may have multiple receiver latches. If conventional test techniques are employed with such equipment, each latch may only be exposed to a static pattern, and thus only static mono failure of the given latch may be detected.

Accordingly, it would be desirable to provide an apparatus and method where test patterns can be offset in successive frames, such that more failure modes can be detected than with a test technique where offset is not employed, for equipment having multiple receiver latches, and other equipment that can benefit from pattern offset.

SUMMARY OF THE INVENTION

An illustrative method for generating an offset test pattern, according to one aspect of the invention, can include the steps of generating a first group of N consecutive frames each containing a test pattern, where N is greater than or equal to 2 and the N consecutive frames are numbered n=1, 2, ..., N; and offsetting each of the frames numbered n=2 through N by a predetermined amount relative to the first frame, to enhance diagnostic capabilities of the test pattern.

In another aspect, one exemplary embodiment of an apparatus for testing a communications device can include a pattern generator that is configured to generate a first group of N consecutive frames each containing a test pattern of the kind just described, and an offset constructor coupled to the pattern generator. The offset constructor can be configured to offset frames as described in the preceding paragraph.

In yet another aspect, an apparatus according to another exemplary embodiment of the present invention can be configured to provide BIST capability to a communications circuit, device, or component, such as, for example, an integrated circuit.

A more complete understanding of the present invention, as well as further features and advantages of the present invention, will be obtained by reference to the following detailed description and drawings.

DETAILED DESCRIPTION

Figure 1:
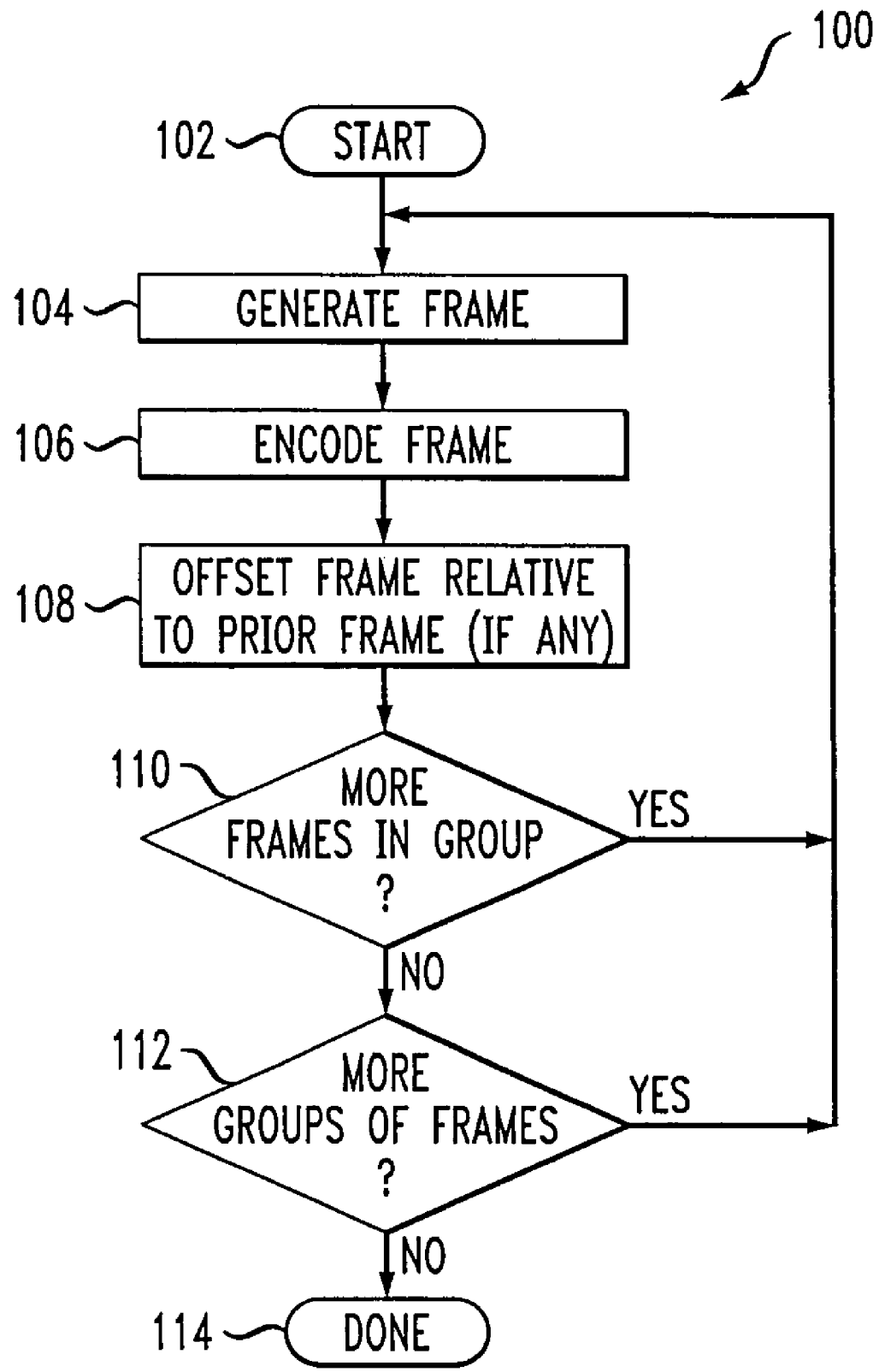
FIG. 1 is a flow chart depicting exemplary method steps for generating an offset test pattern in accordance with an aspect of the present invention.

Reference should now be had to FIG. 1, which depicts a flow chart 100 illustrating steps of an exemplary method for generating an offset test pattern according to one aspect of the present invention. The method can include the steps of generating a first group of N consecutive frames each containing a test pattern, where $N \geq 2$, the N consecutive frames being numbered n=1, 2, ..., N; and offsetting each of the frames numbered n=2 through N by a predetermined amount relative to the frame numbered n=1, to enhance diagnostic capabilities of the test pattern. For example, as shown in flow chart 100, after starting at block 102, a frame can be generated at block 104. Optionally, the frame can be encoded as at block 106. The frame can then be offset from the prior frame as at block 108. It will be appreciated that, for the first frame generated, there is no previous frame to be offset from, so no offset operation need be performed in such case.

As shown at decision block 110, if there are additional frames to be generated for a given group of frames, the process can loop back to block 104. Thus, by way of example, if N=4, one would traverse blocks 104, 106 (optionally), and 108 initially, and then repeat three times until all four frames had been generated. As indicated at decision block 112, one could then determine if additional groups of frames were required. If such were the case, one would again loop back to block 104. For example, if it were desired to generate two groups of 4 frames each, after generating the first four frames as described above, one would pass from block 110 to block 112, determine that another group of N frames (in this case, 4) was required, and repeat the process for the four additional frames of the second group of four frames. If no additional groups of frames are required, one is done, as per block 114, but it will of course be realized that one can traverse through the method again when additional tests are desired.

The predetermined amount by which a frame is offset from a preceding frame can be any amount that results in the piece of equipment under test being exposed to a desired pattern. In a typical case, the predetermined amount can be a number of bits equal to n−1, that is, each frame can be offset by one bit as compared to a preceding frame. The encoding step can be employed when necessary or desirable, depending on the type of equipment being tested and the applicable standard(s) that govern the equipment, its testing, and its operation. In the Fibre Channel standard mentioned above, 8b10b encoding can be employed. Test patterns according to other standards can be employed. By way of example and not limitation, such other standards can include SAS (serial attached SCSI (small computer system interface)), SATA (serial advanced technology attachment), PCIE (PCI (peripheral components interface) express), and RapidIO (RapidIO interconnect architecture as specified by the RapidIO Trade Association).

As noted, one aspect of the present invention allows the offsetting of frames to enhance diagnostic capabilities of a given test pattern. By way of example, one type of equipment that can benefit from such offsetting is a receiver having two or more latches numbered m=1, 2, . . . , M; such latches can be, e.g., high speed data latches operating at frequencies on the order of GHz. The receiver can be a stand alone unit, or can be associated with a unit having both transmit and receive capability. One exemplary application is to a serializer/deserializer (SerDes). In such a case, the number of frames N in a group of frames undergoing the offset process should be greater than or equal to, and an integer multiple of, M:

$$N \geq M \qquad (1)$$

$$N = iM \qquad (2)$$

where i is an integer greater than or equal to 1.

Figure 2:
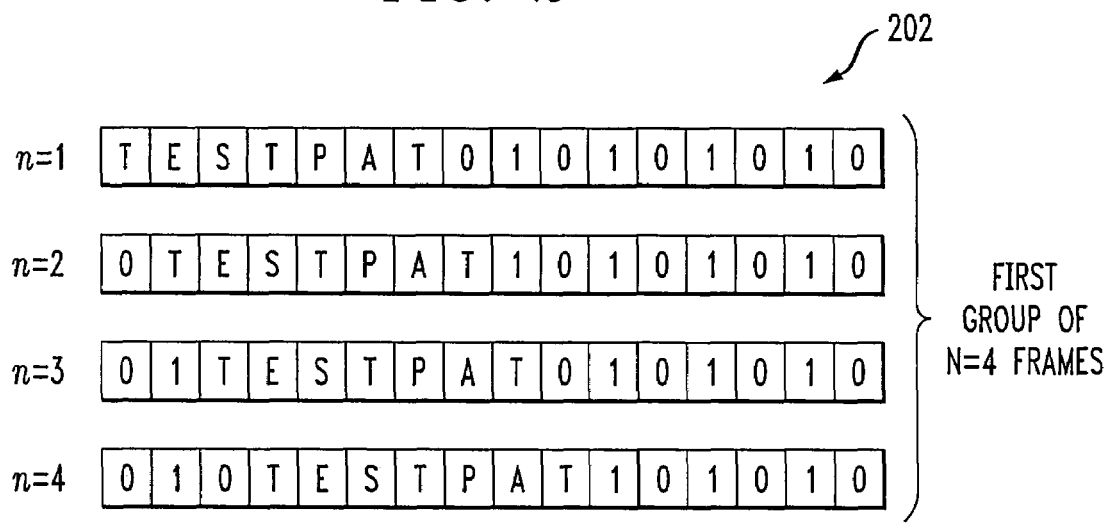
FIG. 2 depicts an exemplary offset test pattern in two groups of four frames each.
Figure 2:
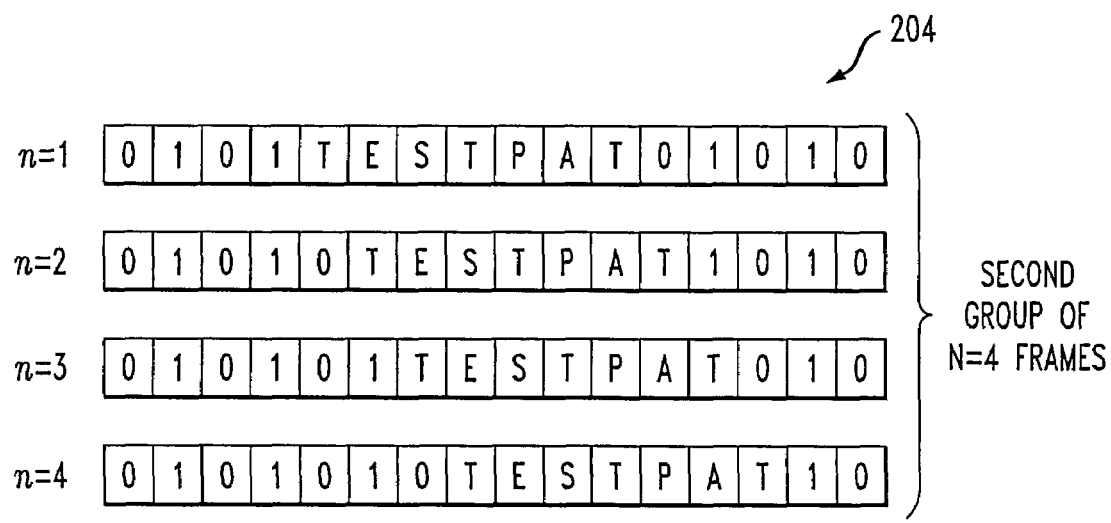

Attention should now be given to FIG. 2, which shows two groups 202, 204 of N=4 frames each. The test pattern is depicted as the letters "TESTPAT" but the skilled artisan will appreciate that the test pattern will comprise one of a number of different possible bit sequences, depending on criteria such as what standard one is following. Further, the "TESTPAT" is shown, for illustrative convenience, encapsulated in a frame of alternating zeroes and ones. It will be appreciated that the frame may include any desired bit sequence; for example, in the aforementioned Fibre Channel standard, the test pattern is encapsulated into a frame including an SOP (start of packet) field, DATA (the test pattern), a CRC (cyclic redundancy check) field, an EOP (end of packet) field, and an IOS (idle ordered set). Table A.11 of the Fibre Channel—Methodologies for Jitter and Signal Quality (FC-MJSQ) Specification Technical Report Rev. 10, of Mar. 10, 2003, sets forth in detail the "Compliant Receive Jitter Tolerance Pattern" or "CJPAT" which is known to a person of ordinary skill in the communications art and which is one example of the type of pattern with which aspects of the present invention can be employed. It can be seen that "TESTPAT" is offset by one bit for each subsequent frame in the example shown in FIG. 2.

Figure 3:
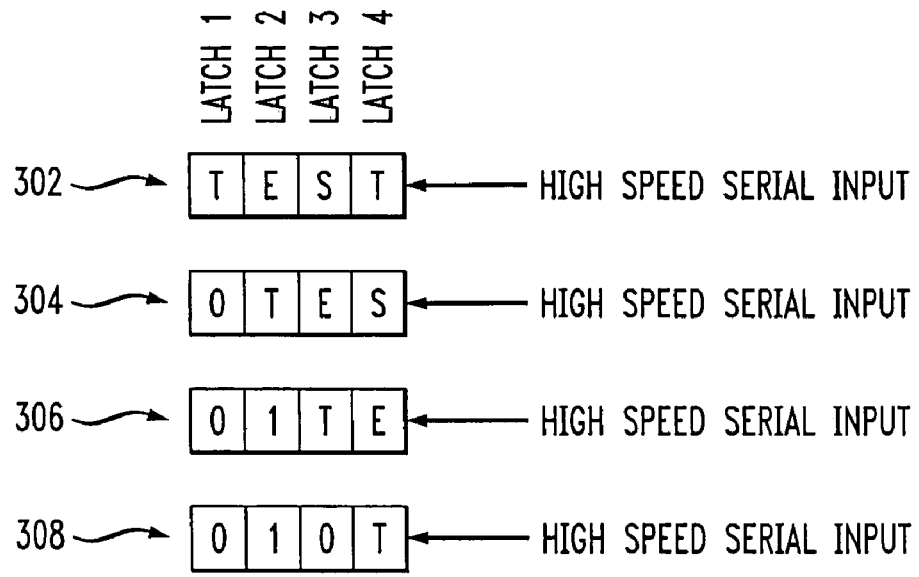
FIG. 3 depicts four latches of a receiver receiving the offset test pattern of FIG. 2 as high speed serial input.

Turning now to FIG. 3, the data pattern to which each of four latches receiving high speed serial input (labeled as Latch 1 through Latch 4 respectively) are exposed is depicted at four time steps numbered 302, 304, 306, and 308. If the offset process of the present invention was not employed, Latch 1 would always see the part of the pattern corresponding to the first "T" in "TESTPAT," Latch 2 would always see the "E," and so on. Note that Latch 4 "sees" first the second "T" in "TESTPAT," then the "S," then the "E," and then the first "T."

Figure 4:
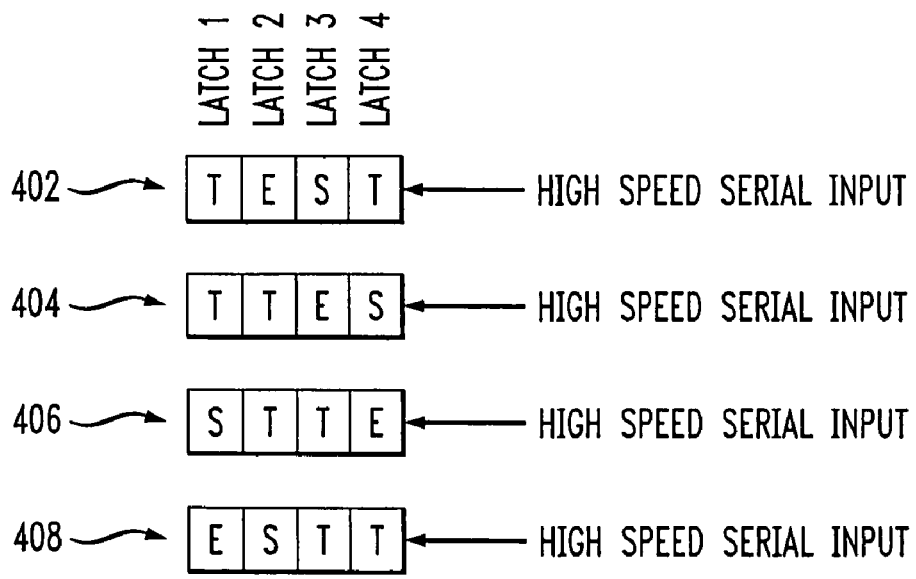
FIG. 4 depicts the effective test pattern to which the four latches of FIG. 3 are exposed to over time.

The effect over time of the phenomena discussed in the preceding paragraph is best appreciated by viewing FIG. 4, which is similar to FIG. 3, for four time steps numbered 402, 404, 406, 408, but the alternating ones and zeroes in which the "TESTPAT" was encapsulated have been eliminated to show only the four letters "TEST"; it will be seen that each latch is exposed in each of the four time steps to each of the four different letters of "TEST," i.e., first "T," "E," "S," and last "T." (Each letter of course represents a corresponding part of a bit sequence of an actual pattern.) It will be appreciated that without the offset effect according to aspects of the present invention, each latch would "see" its own static pattern, different from the other latches, but the same over time with respect to itself. With the offset effect according to aspects of the present invention, over time each latch can be exposed to the same pattern as the other latches (i.e., the latches "see" different portions of the pattern at a given time, but over time, each can be exposed to the full pattern). It should be noted that the test pattern may have a positive or negative starting disparity and may advantageously be sized small enough to fit on a laboratory BERTS (bit error rate test system). Note that when encoding and decoding are employed, the offsetting (and subsequent removal of the offset) is typically performed on the encoded data.

Figure 5:
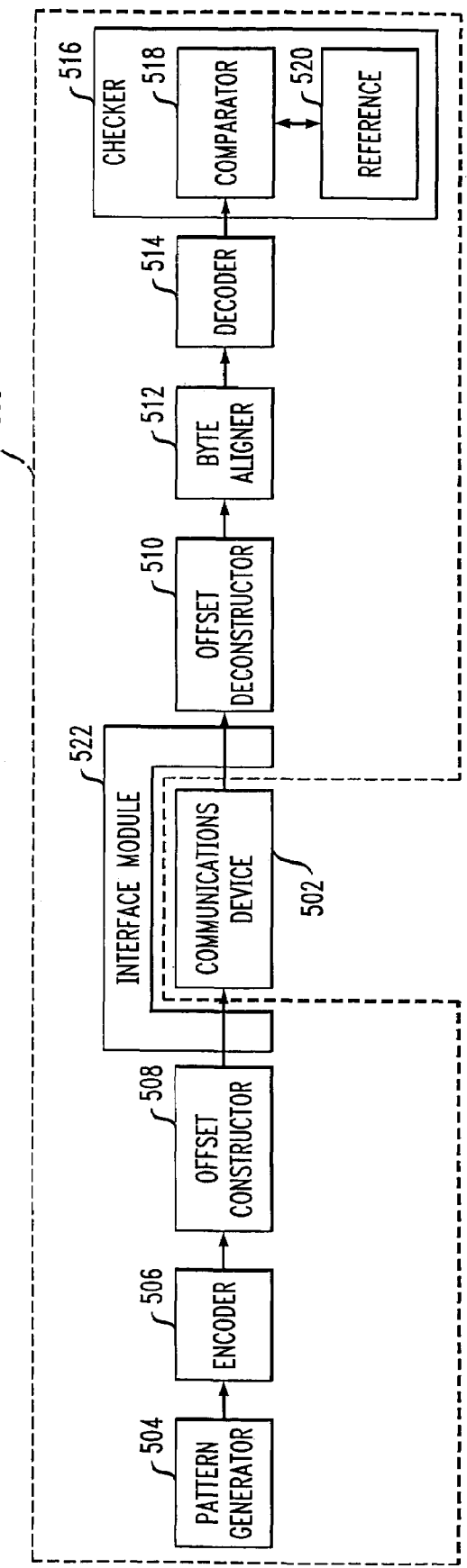
FIG. 5 depicts an exemplary embodiment of an apparatus for testing a communications device according to an aspect of the present invention.

Attention should now be given to FIG. 5, which depicts an exemplary embodiment of an apparatus 500 for testing a communications device 502, according to an aspect of the present invention. The apparatus 500 can include a pattern generator 504 that is configured to generate a first group of N consecutive frames each containing a test pattern, and an offset constructor 508 coupled to the pattern generator 504. As discussed above with regard to an exemplary method, N should be greater than or equal to 2, and the N consecutive frames can be numbered n=1, 2, . . . , N. The said offset constructor 508 can be configured to offset each of the frames numbered n=2 through N by a predetermined amount relative to the frame numbered n=1, to enhance diagnostic capabilities of the test pattern, as previously discussed.

Apparatus 500 can optionally include an encoder 506 interposed between pattern generator 504 and offset constructor 508. Encoder 506 can be configured to receive the first and subsequent groups of N consecutive frames, to encode the frames to generate encoded frames, and to pass the encoded frames to the offset constructor 508. Further, apparatus 500 can optionally include an offset deconstructor 510 that is configured to remove the offset from each of the offset frames, a byte aligner 512 that recognizes frame boundaries via special symbols (useful, for example, in Fibre Channel compliant physical link layer data paths), a decoder 514 (employed when encoder 506 is employed) to decode the encoded frames with the offset removed, and a checker 516 configured to compare the output of the offset deconstructor 510 (passed through the byte aligner 512 and/or decoder 514 as required for a given application) to a reference. The checker 516 can include a comparator 518 (for example a compliant jitter test 10b synchronizer and checker) coupled to a reference 520 (for example an 8b10b reference encoder) for such purpose. Apparatus 500 can further include an interface module 522 configured to interconnect the communications device between the offset constructor 508 and the offset deconstructor 510. The elements 504 through 520 can be coupled as shown in FIG. 5, and when optional elements are not used, adjacent elements can be coupled directly together. Module 522 can include, for example, appropriate connectors to establish electrical and/or optical interconnections to the device 502 to be tested. Device 502 can be any type of device, apparatus, discrete circuit, component, integrated circuit, hybrid circuit, or the like that can benefit from diagnosis with the offset test pattern.

Figure 6:
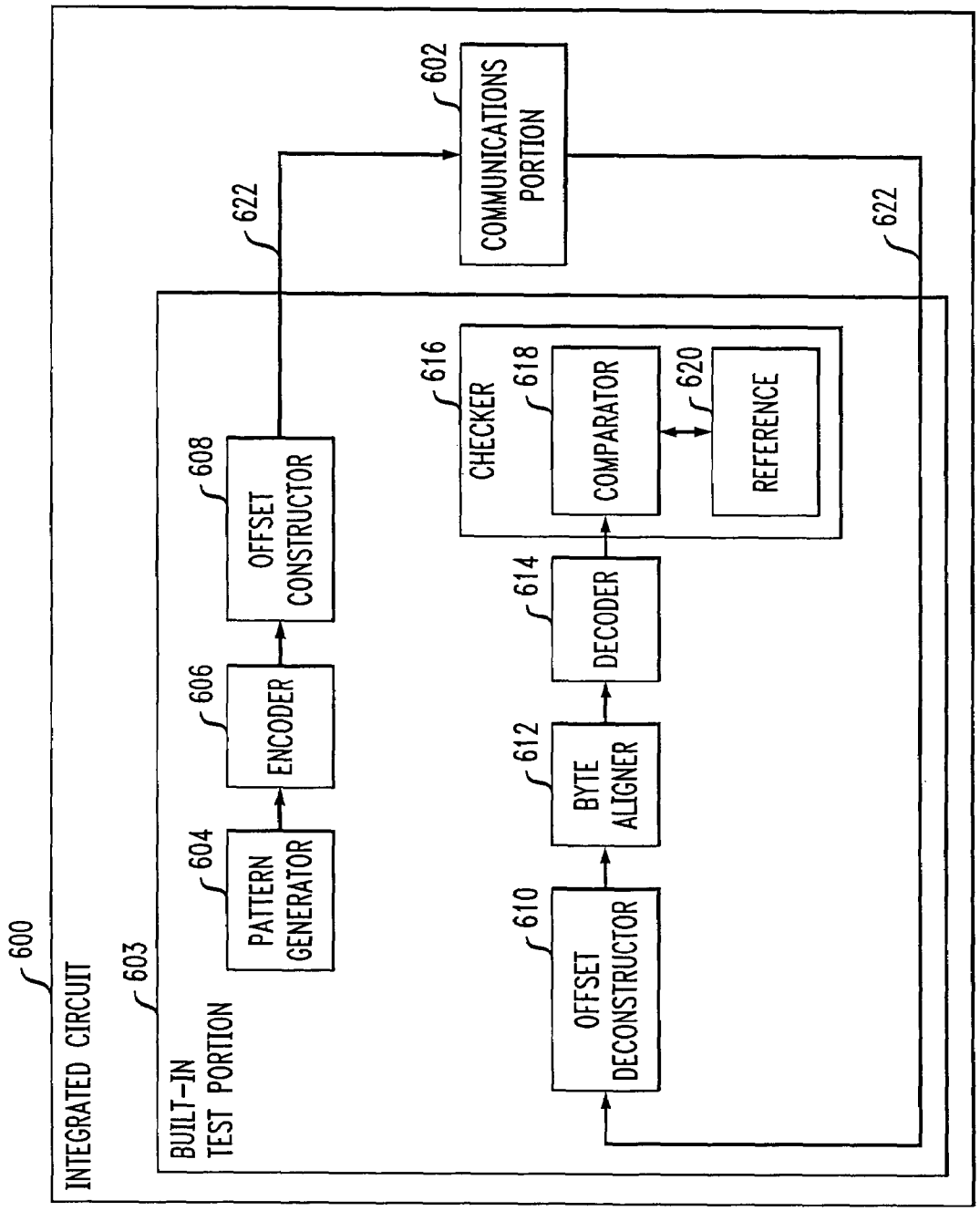
FIG. 6 depicts an exemplary integrated circuit having BIST capability according to another aspect of the present invention.

Reference should now be had to FIG. 6, which shows an exemplary embodiment of an integrated circuit 600, for communications applications, in accordance with another aspect of the present invention. Circuit 600 can include a communications portion 602 and a built-in test portion 603. The communications portion 602 can include any kind of communications functionality typically implemented on an integrated circuit; for example, a receiver, receiver functionality of a transmitter/receiver, or a serializer/deserializer with multiple receiver latches. The built-in test portion can include one or more of elements numbered 604 through 620 similar to elements 504 through 520 described with respect to FIG. 5. The communications portion 602 can be interconnected between offset constructor 608 and offset deconstructor 610 via an interface portion; for example, by appropriate interconnections formed on integrated circuit chip 600 and suggested by arrows 622. The interface portion can, if desired, be configured to selectively interconnect communications portion 602 to test portion 603 for periodic self test and/or other diagnostic functions.

Different aspects and embodiments of the present invention can be implemented, for example, in dedicated hardware, hardware with application specific firmware, software, or a combination thereof, and the test patterns can be generated, for example, lookup tables or appropriately configured shift registers.

At least a portion of the techniques of the present invention described herein may be implemented in an integrated circuit. In forming integrated circuits, a plurality of identical die are typically fabricated in a repeated pattern on a surface on a semi-conductor wafer. Each die can include an entire circuit or elements as described herein, and can include other structures or circuits. The individual die are cut or diced from the wafer, and then packaged as an integrated circuit. One skilled in the art will know how to dice wafers and package die to produce integrated circuits. Integrated circuits so manufactured are considered part of this invention.

Although illustrative embodiments of the present invention have been described herein, it is to be understood that the invention is not limited to those precise embodiments, and that various other changes and modifications may be made by one skilled in the art without departing from the scope of the invention as set forth in the appended claims.

We claim:

1. A method comprising the steps of:
   generating a first group of N consecutive frames each containing a test pattern, where $N \geq 2$, said N consecutive frames being numbered $n=1, 2, \ldots, N$;
   offsetting each of said frames numbered $n=2$ through N by a predetermined amount relative to said frame numbered $n=1$, to form an offset test pattern with enhanced diagnostic capabilities; and
   testing a receiver having M receiver latches numbered $m=1, 2, \ldots, M$, $M \geq 2$, by exposing said receiver to said offset test pattern;
   wherein:
   $N \geq M$; and
   $N=iM$ where i is an integer $\geq 1$.

2. The method of claim 1, wherein said predetermined amount is given by a number of bits equal to $n-1$.

3. The method of claim 2, further comprising the additional steps of:
   generating subsequent groups of N consecutive frames; and
   offsetting each frame in said subsequent groups by one bit relative to a preceding frame.

4. The method of claim 3, further comprising the additional steps of encoding said first and subsequent groups of N consecutive frames.

5. The method of claim 4, wherein said encoding comprises 8b/10b encoding and the test pattern comprises a standard jitter test pattern corresponding to at least one of a fibre channel standard, a SAS (serial attached SCSI (small computer system interface)) standard, a SATA (serial advanced technology attachment) standard, a PCIE (PCI (peripheral components interface) express) standard, and a RapidIO (RapidIO interconnect architecture as specified by the RapidIO Trade Association) standard.

6. An apparatus for testing a communications device, comprising:
   a pattern generator that is configured to generate a first group of N consecutive frames each containing a test pattern, where $N \geq 2$, said N consecutive frames being numbered $n=1, 2, \ldots, N$; and
   an offset constructor coupled to said pattern generator, said offset constructor being configured to offset each of said frames numbered $n=2$ though N by a predetermined amount relative to said frame numbered $n=1$, to form an offset test pattern with enhanced diagnostic capabilities;
   wherein:
   said predetermined amount is given by a number of bits equal to $n-1$;
   said diagnostic capabilities of the test pattern are enhanced for testing of a receiver having M receiver latches numbered $m=1, 2, \ldots, M$, $M \geq 2$;
   $N \geq M$; and
   $N=iM$ where i is an integer $\geq 1$.

7. The apparatus of claim 6, further comprising:
   an offset deconstructor configured to remove said offset from each of said frames numbered $n=2$ through N;
   a checker configured to compare output of said offset deconstructor to a reference; and
   an interface module configured to interconnect the communications device between said offset constructor and said offset deconstructor.

8. The apparatus of claim 7, further comprising:
   an encoder interposed between said pattern generator and said offset constructor; said encoder being configured to receive said first and subsequent groups of N consecutive frames, to encode said frames, thereby generating encoded frames, and to pass said encoded frames to said offset constructor; and
   a decoder interposed between said offset deconstructor and said checker, said decoder being configured to receive, from said offset deconstructor; said encoded frames numbered $n=2$ through N with said offset removed, and to decode said encoded frames;
   wherein said offset constructor is configured to offset said encoded frames and said offset deconstructor is configured to remove said offset from said encoded frames.

9. An integrated circuit for communications applications, with built-in test capability, said integrated circuit comprising:
   a communications portion; and
   a built-in test portion, said built-in test portion in turn comprising:
      a pattern generator that is configured to generate a first group of N consecutive frames each containing a test pattern, where $N \geq 2$, said N consecutive frames being numbered $n=1, 2, \ldots, N$;
      an offset constructor coupled to said pattern generator, said offset constructor being configured to offset each of said frames numbered $n=2$ through N by a predetermined amount relative to said frame numbered $n=1$, to enhance diagnostic capabilities of the test pattern;
      an offset deconstructor configured to remove said offset from each of said frames numbered $n=2$ though N;
      a checker configured to compare output of said offset deconstructor to a reference; and an interface portion configured to interconnect said communications portion between said offset constructor and said offset deconstructor;
wherein:
said predetermined amount is given by a number of bits equal to n−1;

said communications portion comprises a receiver having M receiver latches numbered m=1, 2, . . . , M, M≧2;
N≧M; and
N=iM where i is an integer ≧1.

* * * * *

UNITED STATES PATENT AND TRADEMARK OFFICE
CERTIFICATE OF CORRECTION

| | | |
|---|---|---|
| PATENT NO. | : 7,447,965 B2 | Page 1 of 1 |
| APPLICATION NO. | : 11/121164 | |
| DATED | : November 4, 2008 | |
| INVENTOR(S) | : Robert D. Brink | |

It is certified that error appears in the above-identified patent and that said Letters Patent is hereby corrected as shown below:

In claim 2, column 5, line 52, "n=1" should be replaced by -- n-1 --.

Signed and Sealed this
Eleventh Day of December, 2012

David J. Kappos
*Director of the United States Patent and Trademark Office*